(12) United States Patent
Henderson et al.

(10) Patent No.: US 10,442,705 B2
(45) Date of Patent: Oct. 15, 2019

(54) APPARATUS AND METHOD FOR WATER TREATMENT

(71) Applicant: Greenthread Limited, Aberdeenshire (GB)

(72) Inventors: Andrew Henderson, Aberdeenshire (GB); Brian Nutley, Aberdeenshire (GB); Kim Nutley, Aberdeenshire (GB); Ross Clarke, Aberdeenshire (GB)

(73) Assignee: Greenthread Limited (GB)

( * ) Notice: Subject to any disclaimer, the term of this patent is extended or adjusted under 35 U.S.C. 154(b) by 0 days.

(21) Appl. No.: 15/526,877

(22) PCT Filed: Nov. 13, 2015

(86) PCT No.: PCT/GB2015/053466
§ 371 (c)(1),
(2) Date: May 15, 2017

(87) PCT Pub. No.: WO2016/075493
PCT Pub. Date: May 19, 2016

(65) Prior Publication Data
US 2017/0320754 A1 Nov. 9, 2017

(30) Foreign Application Priority Data
Nov. 13, 2014 (GB) .................................. 1420231.1

(51) Int. Cl.
*C02F 1/34* (2006.01)
*C02F 1/32* (2006.01)
(Continued)

(52) U.S. Cl.
CPC ................ *C02F 1/325* (2013.01); *C02F 1/34* (2013.01); *C02F 1/725* (2013.01); *C02F 1/78* (2013.01);
(Continued)

(58) Field of Classification Search
CPC .... C02F 1/325; C02F 1/34; C02F 1/36; C02F 1/74; C02F 1/72; C02F 2103/008;
(Continued)

(56) References Cited

U.S. PATENT DOCUMENTS 3,214,149 A * 10/1965 Budzien .................. F04D 5/002
116/137 A
2010/0090124 A1 * 4/2010 Kazem .................... A23L 3/015
250/435

(Continued)

*Primary Examiner* — Walter D. Griffin
*Assistant Examiner* — Cameron J Allen
(74) *Attorney, Agent, or Firm* — The Kubiak Law Firm, PLLC

(57) ABSTRACT

An apparatus for use in a liquid treatment process, and a method of use is described. The apparatus comprises an inlet configured to be connected to a source of liquid to be treated and an outlet for discharging liquid from the apparatus. At least one liquid treatment vessel or conduit is disposed between the inlet and the outlet, and is arranged to expose liquid in the vessel to ultraviolet radiation in an advanced oxidation process reaction. A source of ultraviolet radiation extending along the liquid treatment vessel or conduit, such that an annular flow volume is defined in the vessel or conduit around the source of ultraviolet radiation. A rotary device is disposed in the annular flow volume and a drive mechanism drives rotation of the rotary device. The rotary device is operable to induce cavitation in a liquid present in the annular flow volume.

19 Claims, 15 Drawing Sheets

(51) Int. Cl.
*C02F 1/72* (2006.01)
*C02F 1/78* (2006.01)
*C02F 101/32* (2006.01)

(52) U.S. Cl.
CPC .. *C02F 2101/32* (2013.01); *C02F 2201/3223* (2013.01); *C02F 2305/10* (2013.01)

(58) Field of Classification Search
CPC ........ C02F 2201/3222; C02F 2201/326; C02F 2303/04; C02F 9/00; A23L 3/015; A23L 3/28; A61L 2/02; A61L 2/08; A61L 2/10; A61L 2/12; A61L 2/202; A61L 2/208; B01F 3/04531; B01F 7/00816; B01F 13/0001; B01F 13/001; B01F 2003/04886
See application file for complete search history.

(56) References Cited

U.S. PATENT DOCUMENTS

| | | | |
|---|---|---|---|
| 2012/0318749 A1* | 12/2012 | Stokes | C02F 1/325 210/748.09 |
| 2013/0248429 A1* | 9/2013 | Dahule | C02F 1/325 210/150 |
| 2014/0332406 A1* | 11/2014 | Nottke | C25F 7/00 205/763 |

\* cited by examiner

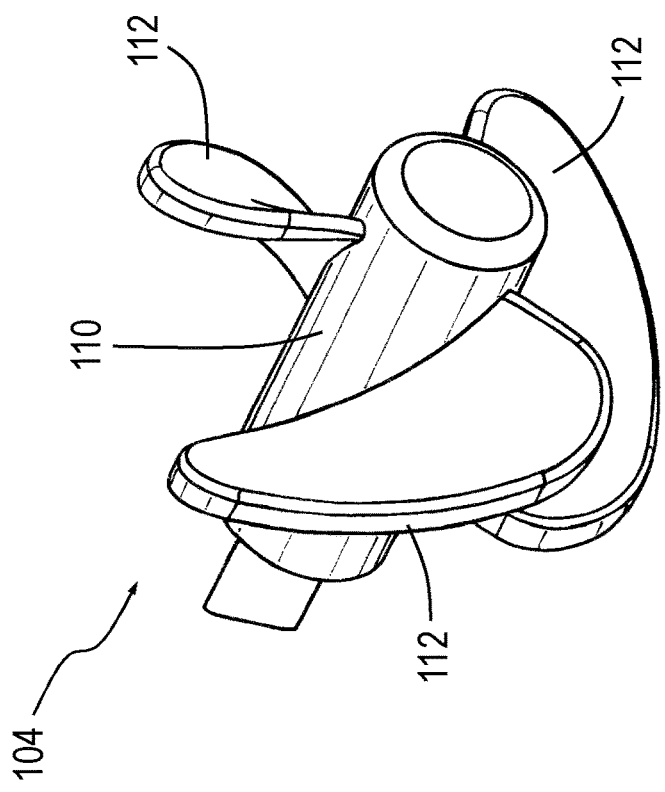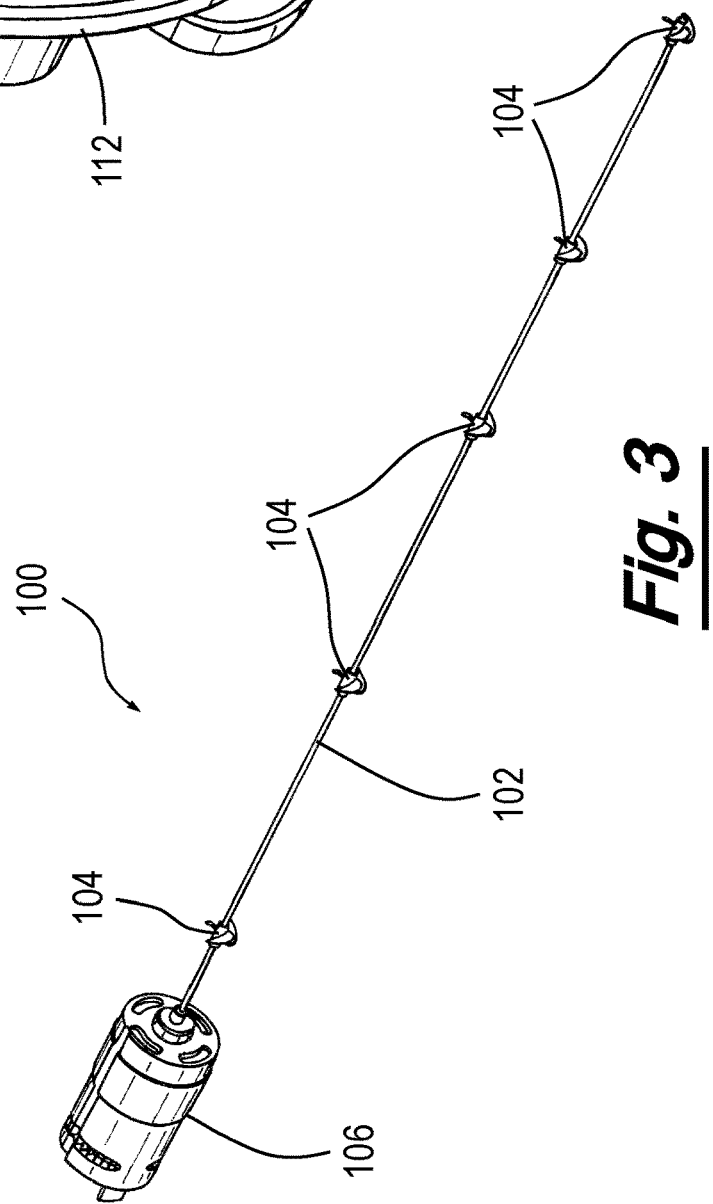

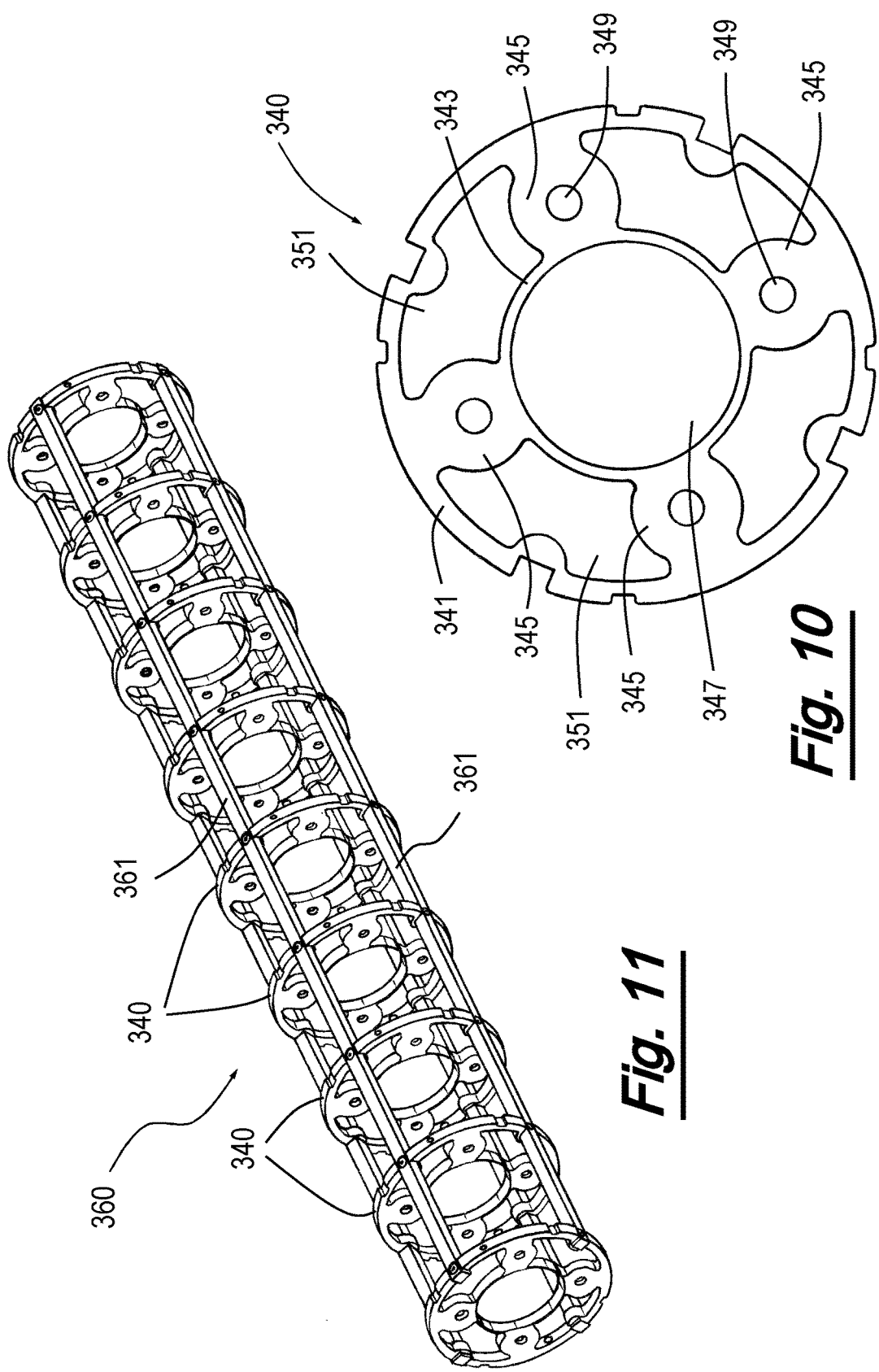

APPARATUS AND METHOD FOR WATER TREATMENT

The present invention relates to apparatus for the treatment of liquids such as industrial water and methods of use, and in particular to apparatus for the treatment of water by photocatalytic oxidation, and related methods.

In one aspect, the invention relates to a water treatment apparatus and a method of use in a photocatalytic process. An aspect of the invention relates to a cavitation device for a water treatment apparatus or system and a method of use in a photocatalytic process.

BACKGROUND TO THE INVENTION

Industrial wastewaters are generated as a by-product from industrial operations which include (but are not limited to) chemical manufacturing or processing, food and beverage production and the oil and gas industry. In the field of industrial or wastewater treatment, it is known to use advanced oxidation processes (AOPs) to treat water or waste water through interactions with reactive oxygen species such as hydroxyl radicals (.OH). Advanced oxidation processes are useful for a number of reasons, including the high reactivity of hydroxyl radicals and their applicability in oxidising a range of organic and inorganic contaminants; their ability to treat organic compounds directly when in an aqueous phase; and the absence of additional hazardous substances or waste streams.

One example application is in the treatment of produced water in the oil and gas industry. Produced water is a wastewater by-product from hydrocarbon extraction, and it must be separated from the oil and gas fractions of the produced fluid. The separated water will contain low but measurable amounts of organic and inorganic contaminants that have the potential to harm the environment and so the water must be treated. Another hydrocarbon industry application is the treatment of wastewater from hydraulic fracturing operations.

Examples of advanced oxidation processes include those in which oxygen ($O_2$), ozone ($O_3$), hydrogen peroxide ($H_2O_2$) and/or ultraviolet (UV) radiation are used to generate hydroxyl radicals in the reaction process, either alone or in combination with one another. Some advanced oxidation techniques use metal oxide catalysts such as titanium dioxide ($TiO_2$) or aluminium oxide ($Al_2O_3$) in order to lower activation energies, lower ozone consumption, and/or ultimately to enhance reaction parameters such as the rate of reduction in Total Organic Content (or Total Organic Carbon) (TOC). Advanced oxidation processes have been engineered for batch treatment of liquids and continuous online treatment within flow systems.

A range of different factors are known to impact on the efficiency of an advanced oxidation process, and there is generally a demand to improve upon the efficiency of existing systems, process time, and the ability to handle a range of flow rates and contaminants.

GB 2,404,189 describes a process and apparatus for the treatment of produced water from the hydrocarbon production industry, which uses a combination of ozone and UV radiation to reduce hydrocarbon and organic matter within the water. A Venturi ozone injector is used to introduce and dissolve ozone into the produced water flow stream which is subsequently exposed to UV radiation.

WO 2012/056249 discloses a fluid treatment apparatus for an advanced oxidation process. The apparatus comprises a primary flow line connecting an inlet and an outlet of the apparatus and an ozone-injecting device. A reactor vessel includes a UV light source for treating the ozone-enriched fluid. A secondary flow line is arranged in parallel to the primary flow line to provide variation of a fluid flow rate within the apparatus.

While the approaches described in GB 2,404,189 and WO 2012/056249 are useful in certain applications to the treatment of produced water, there remains a commercial need to provide water treatment apparatus and processes which have improved efficacy, economy, reliability and/or flexibility of application.

Cavitation is the process of the formation of the vapour phase of a liquid within cavities or voids in the liquid phase, and occurs when the liquid is subjected to reduced pressures at constant ambient temperature. Hydrodynamic cavitation occurs when a device generates cavitation due to sudden changes in flow geometry, creating local reductions in pressure. Hydroacoustic cavitation is generated by the hydrodynamic generation of periodic changes in liquid pressure.

The implosion of cavities or voids generates intense shock waves. Although the collapse of a single cavity is a relatively low-energy event, localised cavitation is known to cause damage to flow components, pumps, propellers and the like. In particular, cavitation is known to produce pitting or erosion of metals, and has a significant effect on wear and damage on moving components. Although cavitation effects have been harnessed in some industrial cleaning applications, including scale removal and corrosion reduction, where the cavitation energy has been used to loosen adhesion between contaminants and flow surfaces in flow systems.

U.S. Pat. No. 4,906,387 describes a method and apparatus for oxidising contaminants in water, in which cavitation is induced by passing the water through a cavitation nozzle prior to irradiating the water with ultraviolet radiation.

WO 2005/021050 describes an apparatus and method for liquid treatment by a combination of irradiation (for example UV irradiation) and cavitation. The apparatus comprises a rotary cavitation device in the chamber of a reactor. Cavitation of the liquid is said to introduce a greater surface area of fluid in the radiation treatment zone, thereby increasing the rate of exposure of fluid to the radiation.

SUMMARY OF THE INVENTION

It is amongst the aims and objectives of the invention to provide a liquid treatment apparatus and/or method which obviates or mitigates one or more drawbacks or disadvantages of the prior art.

An aim of at least one aspect of the invention is to provide a liquid treatment apparatus and method of use which improves the efficiency, effectiveness or capacity of an advanced oxidation process reaction.

A further aim of at least one aspect of the invention is to provide a rotating or rotary device for use in a photocatalytic advanced oxidation process.

A further aim of at least one aspect of the invention is to provide a cavitation device for use in a photocatalytic advanced oxidation process.

A further aim of at least one aspect of the invention is to provide a pump for use in a liquid treatment process.

Additional aims and objects of the invention will become apparent from reading the following description.

According to a first aspect of the invention, there is provided an apparatus for use in a liquid treatment process, the apparatus comprising:

an inlet configured to be connected to a source of liquid to be treated;

an outlet for discharging liquid from the apparatus;

at least one liquid treatment vessel or conduit disposed between the inlet and the outlet, and arranged to expose liquid in the vessel to ultraviolet radiation in an advanced oxidation process reaction;

a source of ultraviolet radiation extending along the liquid treatment vessel or conduit, such that an annular flow volume is defined in the vessel or conduit around the source of ultraviolet radiation;

a rotary device disposed in the annular flow volume;

and a drive mechanism for driving rotation of the rotary device;

wherein the rotary device is operable to induce cavitation in a liquid present in the annular flow volume.

The inventors have appreciated that inducing cavitation in a liquid, in the presence of ultraviolet radiation, is beneficial to the efficiency and the effectiveness of an advanced oxidation process reaction. In particular, the use of cavitation aids pathogen destruction, the decomposition of organic compounds of low biodegradability, and also enhances the interactions between immiscible liquids resulting in an acceleration of chemical reactions (including reactions resulting from other AOP processes).

The apparatus may be operable to induce hydrodynamic cavitation in the liquid present in the liquid treatment vessel. Alternatively, or in addition, the apparatus may be operable to induce hydroacoustic cavitation. In some embodiments, the apparatus may be operable to induce supercavitation.

The rotary device may comprise one or more vanes or blades. For example, the rotary device may be configured as a propeller, which may comprise one or more vanes or blades. The rotary device may comprise a propeller having two, three, four or more vanes or blades. The rotary device may comprise a screw-type propeller, which may comprise one or more helical vanes or blades.

The apparatus may comprise a plurality of vanes or blades, and may comprise a plurality of groups of vanes or blades. A group of vanes or blades may comprise a plurality of vanes or blades circumferentially arranged around a rotation axis.

The apparatus may comprise a plurality of rotary elements axially separated in the vessel or conduit. Multiple axially separated rotary elements may be driven by a common drive mechanism, and may be driven by a common drive shaft.

The apparatus may comprise a plurality of rotary devices, which may be arranged circumferentially in the flow conduit, and/or which may be arranged circumferentially in an annular flow volume defined by the conduit.

Each of the plurality of rotary devices may comprise a plurality of rotary elements axially separated in the vessel or conduit.

Alternatively, the rotary device may comprise at least one surface comprising at least one orifice wherein the surface and the orifice are operable to rotated with respect to the liquid.

The rotary device may be configured to generate a thrust on a liquid in the liquid treatment vessel. However, in embodiments of the invention, the primary function of the rotary device is to induce cavitation, and the generation of thrust on the liquid may be a secondary consideration. Therefore, any thrust generated by the rotary device may be nominal, negligible, or zero.

In some embodiments of the invention, the apparatus forms a part of a liquid treatment reactor apparatus, which may form a part of a liquid treatment reaction system. The liquid treatment reaction vessel may be configured for an advanced oxidation process reaction in the presence of one or more injection gases.

The apparatus may comprise an injector, which may comprise a Venturi injector, for an oxidation agent such as oxygen or ozone. The rotary device may therefore be configured to induce cavitation in an unpressurised or substantially unpressurised liquid flow stream. Preferably, the rotary device is downstream of the injector in the flow direction of the liquid to be treated. Therefore the rotary device may be configured to induce cavitation in a liquid/gas mixture.

The apparatus may form a part of a cyclonic separator apparatus.

The apparatus may operable to generate a thrust on a liquid present in the liquid treatment vessel, to cause liquid to flow from the inlet to the outlet. The apparatus may therefore be operable as a pump. The pump may comprise a rotary pump element which is exposed to ultraviolet radiation. The inventors have appreciated that exposing a rotary pump element to ultraviolet radiation is beneficial to the efficiency and the effectiveness of an advanced oxidation process reaction.

The pump may be a pump selected from the group comprising:

a vertical centrifugal pump; a horizontal centrifugal pump; an impeller pump; a turbine pump, and/or a screw-type pump.

The pump may comprise a plurality of impeller elements, and may comprise an impeller stack. The plurality of impellers may be arranged to rotate around the same rotational axis.

In some embodiments, the rotary device is configured with generation of thrust as its primary function.

In some embodiments, the at least one impeller is configured to induce cavitation.

Therefore, in a multi impeller configuration, one or more of the impellers can be designed in order to prioritise generation of thrust, and may induce little or no cavitation in the liquid, whereas another of the impellers may be designed to induce cavitation with a reduced or limited generation of thrust.

In some embodiments, the rotary device may comprise one or more sacrificial components. The sacrificial components may be designed to wear, degrade or otherwise deteriorate in use. In particular, the rotary device, or a component thereof, may be designed to wear, degrade or otherwise deteriorate as a consequence of cavitation induced by the rotary device.

One or more components of the apparatus may comprise aluminium. The aluminium may, in use, oxidise to aluminium oxide, providing enhanced photocatalytic effects.

One or more components of the apparatus may be partially or fully coated with a photocatalytic material. Alternatively, or in addition, one or components of the apparatus may be partially of fully constructed from a photocatalytic material (rather than being formed from a non-catalytic material which is subsequently coated). The material may, for example, be a composite of a polymeric material and a photocatalytic metal oxide.

The apparatus may comprise a support structure for the rotary device, which may comprise a plurality of axially separated support elements which support a drive shaft of the rotary device. The axially separated support elements may comprise support plates, each support plate being configured to support multiple rotary devices in the liquid treatment vessel or conduit.

The apparatus may comprise a plurality of contra-rotating rotary devices, and/or a plurality of rotary devices rotating in the same direction but out of phase with one another.

According to a second aspect of the invention, there is provided an apparatus for use in a liquid treatment process, the apparatus comprising:

an inlet configured to be connected to a source of liquid to be treated;

an outlet for discharging liquid from the apparatus;

at least one liquid treatment vessel disposed between the inlet and the outlet, and arranged to expose liquid in the vessel to ultraviolet radiation in an advanced oxidation process reaction;

a source of ultraviolet radiation comprising a radiation-emitting surface;

a rotary device disposed in the liquid treatment vessel;

and a drive mechanism for driving rotation of the rotary device;

wherein the rotary device is operable to induce cavitation in a liquid in the treatment vessel;

and wherein in use, the rotary device is arranged to be disposed a distance less than 10 mm from the radiation-emitting surface.

Embodiments of the second aspect of the invention may include one or more features of the first aspect of the invention or its embodiments, or vice versa.

According to a third aspect of the invention, there is provided an apparatus for use in a liquid treatment process, the apparatus comprising:

an inlet configured to be connected to a source of liquid to be treated;

an outlet for discharging liquid from the apparatus;

at least one liquid treatment vessel disposed between the inlet and the outlet, and arranged to expose liquid in the vessel to ultraviolet radiation in an advanced oxidation process reaction;

a rotary device disposed in the liquid treatment vessel;

and a drive mechanism for driving rotation of the rotary device;

wherein the rotary device is operable to induce cavitation in a liquid in the treatment vessel or conduit;

and wherein the rotary device comprises comprises a plurality of rotary elements axially separated in the vessel or conduit.

Multiple axially separated rotary elements may be driven by a common drive mechanism, and may be driven by a common drive shaft.

Embodiments of the third aspect of the invention may include one or more features of the first or second aspects of the invention or their embodiments, or vice versa.

According to a fourth aspect of the invention, there is provided a pump assembly for a liquid treatment system, the pump assembly comprising:

an inlet configured to be connected to a source of liquid to be treated;

an outlet;

a rotary element disposed in a pump cavity between the inlet and the outlet;

wherein the pump cavity is arranged to expose liquid pump cavity to ultraviolet radiation.

Preferably the pump is operable to induce cavitation in use.

The pump cavity may comprises one or more windows which enable transmission of UV radiation to the interior of the pump cavity from an external UV source.

The pump may comprise a rotary component which is formed, fully or partially, from a photocatalytic material.

The pump may comprise a rotary component which is formed from a metal coated with a photocatalytic material.

The pump may comprise a pump housing, and the pump housing may comprise a source of UV radiation. The pump cavity may be separated from the source of UV radiation by a wall or sheath which is transmissive to UV radiation.

The pump may comprise a toroidal UV source, which may at least partially surround the pump cavity. Alternatively or in addition, the pump may comprise a plurality of UV sources, arranged to at least partially surround the pump cavity. The plurality of UV sources may be vertically or horizontally arranged UV bulbs, which may be arranged around the pump cavity.

Embodiments of the fourth aspect of the invention may include one or more features of the first to third aspects of the invention or their embodiments, or vice versa.

According to a fifth aspect of the invention, there is provided a pump assembly for a liquid treatment system, the pump assembly comprising:

an inlet configured to be connected to a source of liquid to be treated;

an outlet;

a rotary element disposed in a pump cavity between the inlet and the outlet;

wherein the rotary element is operable to induce cavitation in use.

Embodiments of the fifth aspect of the invention may include one or more features of the first to fourth aspects of the invention or their embodiments, or vice versa.

According to a sixth aspect of the invention, there is provided an apparatus for a liquid treatment system, the apparatus comprising:

an inlet configured to be connected to a source of liquid to be treated;

an outlet for discharging liquid from the apparatus;

at least one liquid treatment vessel disposed between the inlet and the outlet, and arranged to expose liquid in the vessel to ultraviolet radiation in an advanced oxidation process reaction;

a rotary cavitation element disposed in the liquid treatment vessel;

wherein the rotary cavitation element comprises one or more sacrificial component, which is configured to wear, degrade or otherwise deteriorate as a consequence of cavitation induced by the rotary cavitation element.

Embodiments of the sixth aspect of the invention may include one or more features of the first to fifth aspects of the invention or their embodiments, or vice versa.

According to further aspects of the invention, there are provided methods of treating a liquid using the apparatus of any previous aspect of the invention or their embodiments.

According to a further aspect of the invention, there is provided an apparatus for a liquid treatment system, the apparatus comprising:

an inlet configured to be connected to a source of liquid to be treated;

an outlet for discharging liquid from the apparatus;

at least one liquid treatment vessel disposed between the inlet and the outlet, and arranged to expose liquid in the vessel to ultraviolet radiation in an advanced oxidation process reaction;

a rotary cavitation element disposed in the liquid treatment vessel.

The apparatus may comprise at least one source of ultraviolet radiation, which may be configured to emit UV radiation at a single UV wavelength, or may be configured to emit UV radiation at multiple UV wavelengths. The UV wavelengths may be discrete wavelengths, or the source may comprise a wideband UV source. The emitted UV radiation may comprise a wavelength or wavelengths in the range of 100 nm to 400 nm, and may comprise the UVC radiation range. Preferably the emitted UV radiation includes at least one wavelength selected from 185 nm and 253.7 nm and/or 254 nm.

According to a further aspect of the invention, there is provided an apparatus for use in a liquid treatment process, the apparatus comprising:

an inlet configured to be connected to a source of liquid to be treated;

an outlet for discharging liquid from the apparatus;

at least one liquid treatment vessel disposed between the inlet and the outlet, and arranged to expose liquid in the vessel to ultraviolet radiation in an advanced oxidation process reaction;

a rotary device disposed in the liquid treatment vessel;

and a drive mechanism for driving rotation of the rotary device.

Embodiments of the further aspects of the invention may include one or more features of the first to sixth aspects of the invention or their embodiments, or vice versa.

According to further aspects of the invention there are provided water treatment apparatus substantially as described herein with reference to the accompanying drawings.

According to further aspects of the invention there are provided methods of treating a liquid substantially as described herein with reference to the accompanying drawings.

BRIEF DESCRIPTION OF THE DRAWINGS

There will now be described, by way of example only, various embodiments of the invention with reference to the drawings, of which:

FIG. 3 is an isometric view of a rotary assembly according to an embodiment of the invention;

FIG. 4 is an isometric view of a rotary element of the embodiment of FIG. 3;

FIG. 10 is a side view of a shaft mounting plate according to an embodiment of the invention;

FIG. 11 is an isometric view of a shaft mounting cage formed from the plates of FIG. 10;

DETAILED DESCRIPTION OF THE PREFERRED EMBODIMENTS

The invention described herein has particular application to systems and processes for the treatment of contaminated liquids and fluid mixtures, such as fluids produced as a by-product of a hydrocarbon exploration or production operation. However, it will be appreciated that application to the treatment of contaminated liquids or waste fluid mixtures from other processes and industries may also be within the scope of the invention. The invention will be described in the context of an advanced oxidation process, and in particular, in the context of an advanced oxidation process which utilises ultraviolet (UV) radiation in combination with the injection of ozone gas to treat contaminated water, optionally in combination with a catalyst such as a metal oxide or peroxide.

Figure 1:
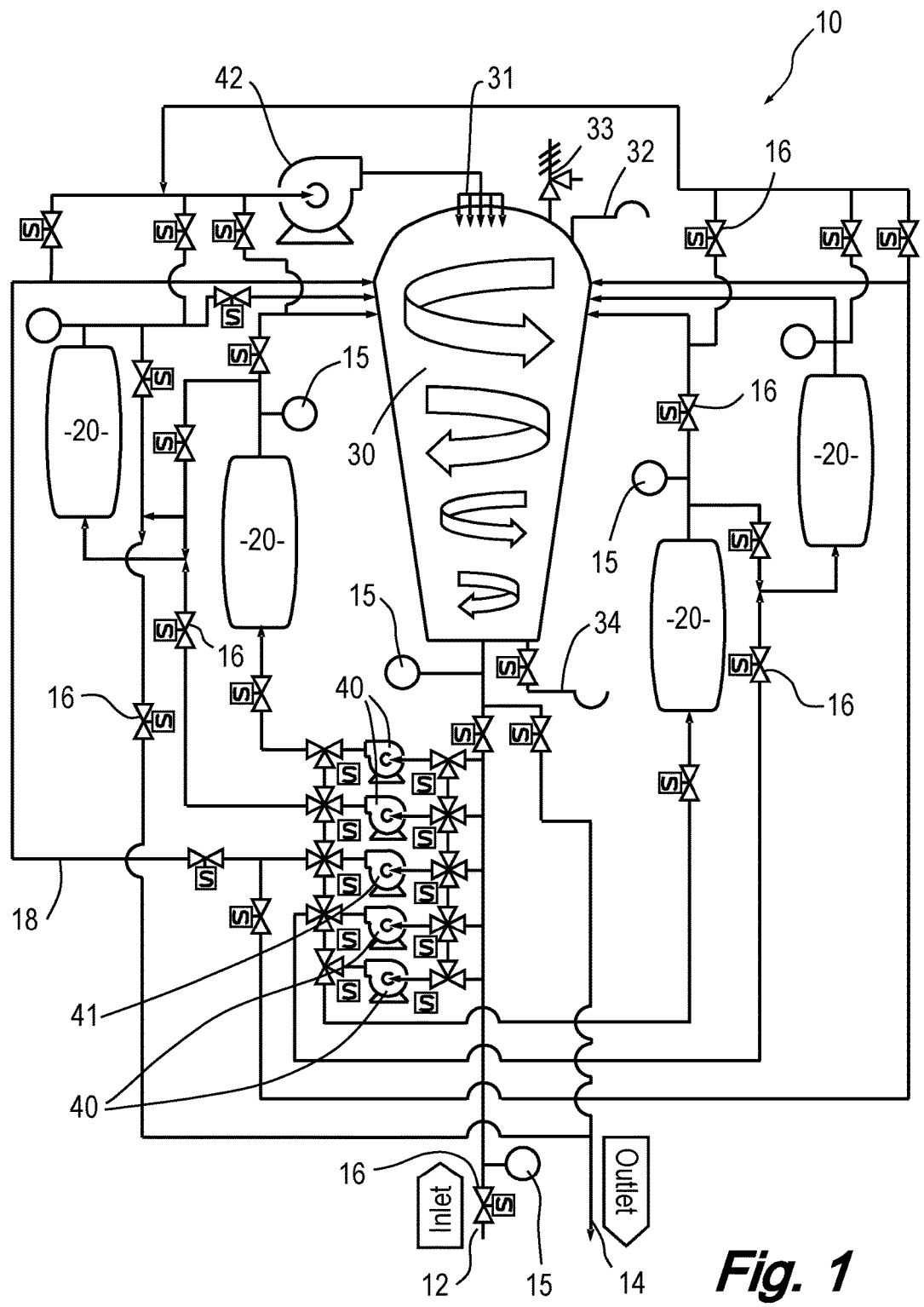
FIG. 1 is a schematic processing instrumentation diagram of a water treatment apparatus in a water treatment system in accordance with an embodiment of the invention.

FIG. 1 is a schematic process and instrumentation diagram for a water treatment system to which embodiments of the invention may be applied. The system, generally depicted at 10, comprises four water treatment apparatus 20 and a separation vessel 30 disposed between an inlet 12 and an outlet 14. Each of the apparatus 20 is configured for an advanced oxidation process reaction which uses a combination of UV radiation and injection of ozone, optionally in the present of a photocatalyst to generate hydroxyl radicals. The separation vessel 30 is configured to provide a hydrocyclonic process for the separation of liquids, gases and solids from the treatment liquid entering the vessel 30.

The apparatus 20 are connected with an arrangement of flow lines and controllable flow valves 16, such that they may be operated in series or in parallel, depending on the treatment requirements. Each apparatus 20 is provided with its own outlet line which forms an independent inlet to the separation vessel 30. Each apparatus 20 is provided with its own pump 40. Bypass line 18 is provided with its own bypass pump 41. The separation vessel 30 is also provided with a misting or spraying inlet 31 which receives fluid from a secondary pump 42. The secondary pump 42 enables liquid exiting the apparatus 20 to be diverted to the misting inlet of the separation vessel 30. Separation vessel 30 comprises a gas vent line 32, a pressure release valve 33 and a drain line 34 for removing solids.

Sensors 15 disposed at various locations in the flow system communicate detection signals to a control module (not shown) for control of the flow regime through the apparatus 20, the separation vessel 30, through operation of the controllable valves 16 and the various pumps 40, 41 and 42. The flow system may therefore be operated in a wide range of series, parallel, bypass, recirculation and discharge modes.

A principle of the present invention is to provide one or more flow components of a treatment system, such as the system 10 shown in FIG. 1, with a rotary device in the flow of liquid, where the rotary device is exposed to UV radiation during liquid treatment.

Figure 2:
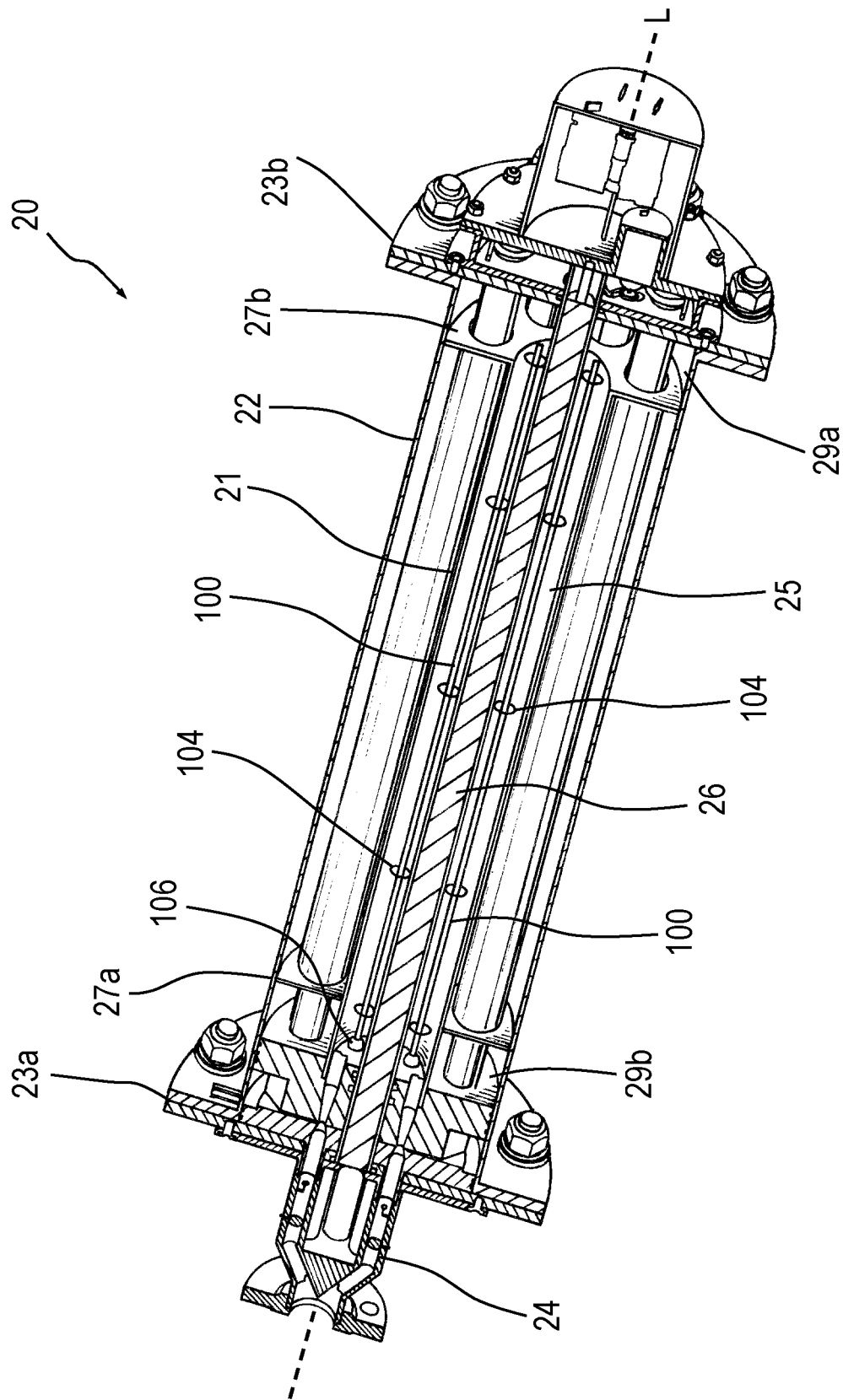
FIG. 2 is a sectional view of a water treatment apparatus in accordance with the first embodiment of the invention.

Referring to FIG. 2, there is shown a first embodiment of the invention, applied to the water treatment apparatus 20 of the treatment system 10. As noted above, the apparatus 20 is designed for an advanced oxidation process which utilises UV radiation in combination with injection of ozone gas. In FIG. 2, the apparatus 20 is shown as a cut away isometric view, which reveals a longitudinal section through the apparatus.

The apparatus comprising a housing 22, which in this case is a substantially cylindrical housing having a first end, a second end and a longitudinal axis L. In FIG. 2, the apparatus is arranged substantially horizontally, although depending on the application, the apparatus 20 may be horizontal, vertical, or in an intermediate inclined orientation. The housing 22 comprises a cylindrical main body and first and second flange assemblies 23a, 23b which enclose internal components and seal the apparatus.

The apparatus comprises an injection assembly 24, and a first liquid treatment vessel downstream of the injector assembly. The first liquid treatment vessel in is the form of conduit 25. The conduit is coaxial with the longitudinal axis of the apparatus, and defines an annular flow volume around a source of UV radiation 26. The UV source 26 comprises an ultraviolet lamp, which is cylindrical in form, and extends through the apparatus in a longitudinal direction, along the centre of the conduit. The lamp is therefore coaxial with the longitudinal axis of the apparatus. In this case, a single lamp is depicted within the centre of the conduit, but in alternative embodiments a lesser or greater number of lamps may be provided.

The conduit 25 is defined by an inner mandrel 21 which extends longitudinally along the length of the apparatus and which is supported by first and second shroud ends 27a, 27b. The first and second shroud ends also support a plurality of inner barrels 28 distributed circumferentially around the conduit. In this case, eight inner barrels are defined, but in alternative embodiments a lesser or greater number of inner barrels may be provided. The inner mandrel 21, first and second shroud ends 27, and inner barrels 28 together form a skeletal structure of the apparatus which defines a flow path through the apparatus. Flow is redirected from the injector assembly 24, through the conduit 25 to the barrels 28 via an intermediate flow manifold 29a, and the flow is directed to an outlet (not shown) via a flow collection manifold 29b.

The conduit 25 is provided with a plurality of rotary devices in the form of rotary assemblies 100. FIGS. 3 and 4 show features of the rotary assembly 100 in more detail. Each rotary assembly 100 comprises an extended drive shaft 102, a plurality of rotary elements 104, and a motor assembly 106. In this embodiment, five rotary elements 104 are provided on a single drive shaft 102 in each rotary assembly 100. It will be appreciated that in alternative embodiments a lesser or greater number of rotary elements may be provided on one or more of the assemblies.

In this embodiment, three rotary assemblies 100 are provided in the conduit, circumferentially positioned around the longitudinal axis at 120 degree spacing (again, it will be understood that a lesser or greater number of rotary assemblies may be provided in alternative embodiments of the invention). The motor assembly 106 is mounted in the injector assembly 24 at the first end of the conduit, and an opposing end of the drive shaft is mounted in a bearing (not shown) at the opposing end of the conduit. Additional bearings may be provided along the length of the drive shaft to mount the drive shaft in the conduit if required, depending on the length and the nature of the drive shaft.

A rotary element 104 is shown in more detail in FIG. 4. The rotary element 104 is configured as a propeller, comprising a body 110 and a plurality of vanes in the form of blades 112. In this embodiment, three blades 112 are provided. The blades are sized and shaped to induce hydrodynamic cavitation, and in particular hydro acoustic cavitation, in a liquid being treated when driven to rotate by the motor assembly 106.

The motor assembly comprises a high torque, high revolutions per minute (RPM) electric motor. The motor has a variable speed drive which enables automatic RPM control for varying fluid properties or flow conditions.

In this embodiment, those elements of the rotary assembly which are exposed to fluid flow (namely, the drive shaft and the rotary elements) are coated in titanium dioxide. Titanium dioxide is a photocatalyst which, in the presence of ultraviolet radiation, enhances the effectiveness and efficiency of an advanced oxidation process reaction.

It should be noted that although the rotary elements 104 resemble conventional three bladed propellers, and may provide thrust on fluid in the liquid treatment vessel, the apparatus is specifically configured to induce cavitation. This is contrary to the normal operative mode of a conventional propeller, the design of which is typically optimised to reduce or eliminate cavitation effects. Cavitation is generally considered to be detrimental in a flow system due to, for example, the damaging effect of cavitation shock waves on flow surfaces and the increased wear on moving components. Contrary to conventional use, cavitation effects may be optimised by design of the rotary elements, by operating the motor assembly in regimes which induce cavitation for a particular rotary element design or by a combination of the design and operational factors. Design and operational considerations will be described in more detail below.

The inventors have appreciated that inducing cavitation in a fluid to be treated in the presence of ultraviolet radiation, is beneficial to the efficiency and effectiveness of an advanced oxidation process reaction. In particular, the use of cavitation has been found to aid pathogen destruction, the decomposition of organic compounds of low biodegradability, and also enhances the interaction between immiscible liquids resulting in an acceleration of chemical reactions.

Figure 5:
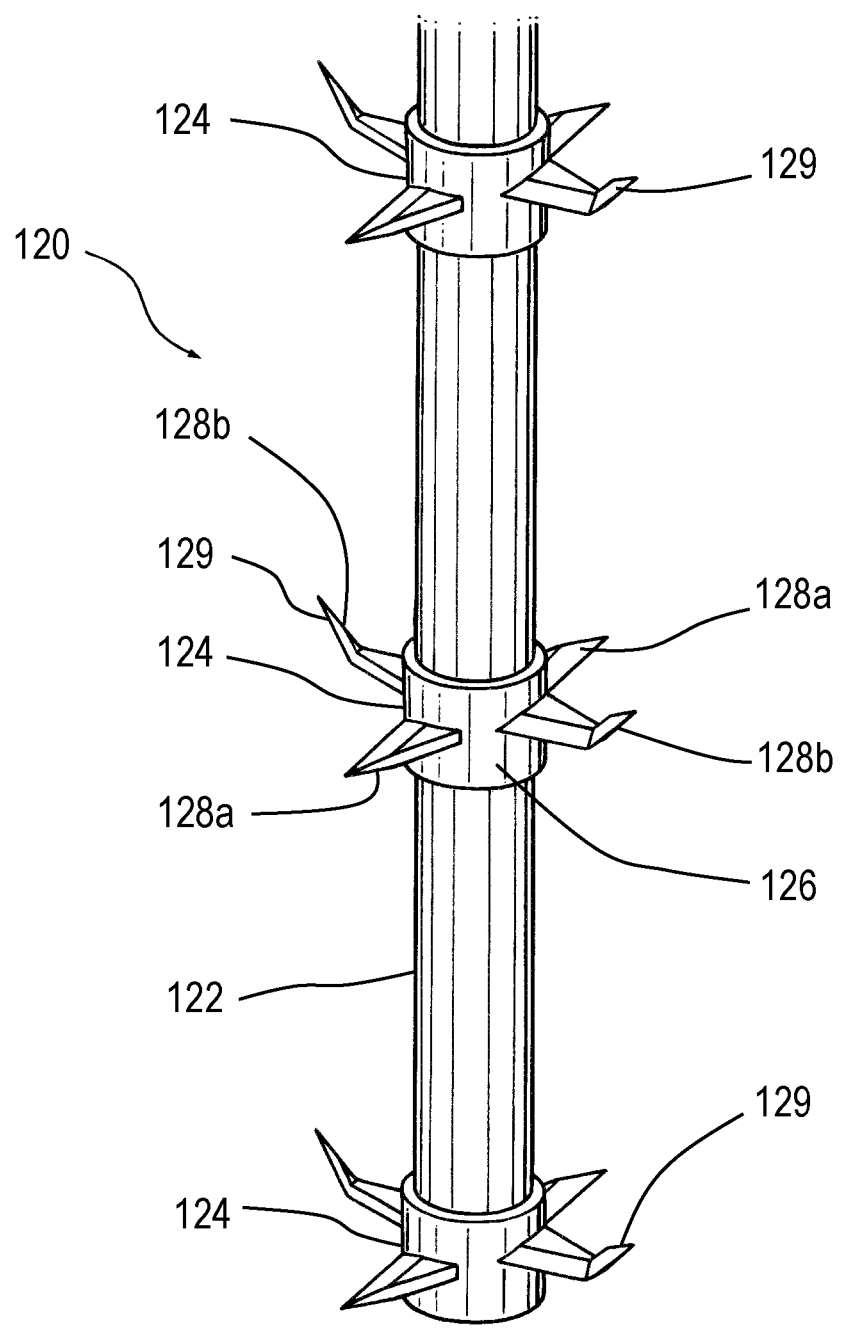
FIG. 5 is an isometric view of a rotary device in accordance with an alternative embodiment of the invention.

Referring now to FIG. 5, there is shown a part of a rotary device in accordance with an alternative embodiment of the invention. The rotary device, generally depicted at 120, comprises a drive shaft 122 and a plurality of rotary elements 124. In this embodiment, the rotary elements comprise a body 126 and a plurality of blades 128a, 128b circumferentially distributed around the body. In this embodiment, four blades 128 are provided in diametrically opposed positions around the body 126. Each of the blades 128 comprises a leading edge and a trailing edge which converge together to a sharp point. The leading edge is tapered to define a sharp blade element, and the trailing edge defines a shoulder, and is therefore relatively blunt.

The two blades 128a are flat and oriented substantially in the same plane, perpendicular to the longitudinal axis of the shaft. In contrast, each blade 128b comprises a tip 129 which is inclined with respect to a plane perpendicular to the longitudinal axis of the drive shaft. The tips 129 are inclined towards a downstream flow direction.

In common with the previous embodiment, the rotary assembly 20 of FIG. 5 is designed to induce cavitation in the flow of liquid, with minimal generation of thrust. Instead, the primary effect of the rotary assembly 120 is to induce hydrodynamic and hydroacoustic cavitation. A secondary effect of the rotary assembly 120 is mixing and shearing of the liquid in the flow conduit. Indeed, the shape of the blades 128 resembles blades used in a food mixer or food blender, and has similar effect on mixing and blending fluid.

It will be appreciated that a variety of different designs of rotary element may be used in accordance with embodiments of the invention. In particular, various propeller designs and/or drive regimes may be used to induce cavitation.

A range of factors are known to effect cavitation characteristics of rotating elements such as propellers, and these include:

Expanded Area Ratio (EAR) where EAR=Expanded Area of the propeller $A_E$ divided by Disc Area $A_D$ Developed Area Ratio (DAR), where DAR=Developed Area $A_D$ divided by Disc Area $A_O$)

Figure 6A:
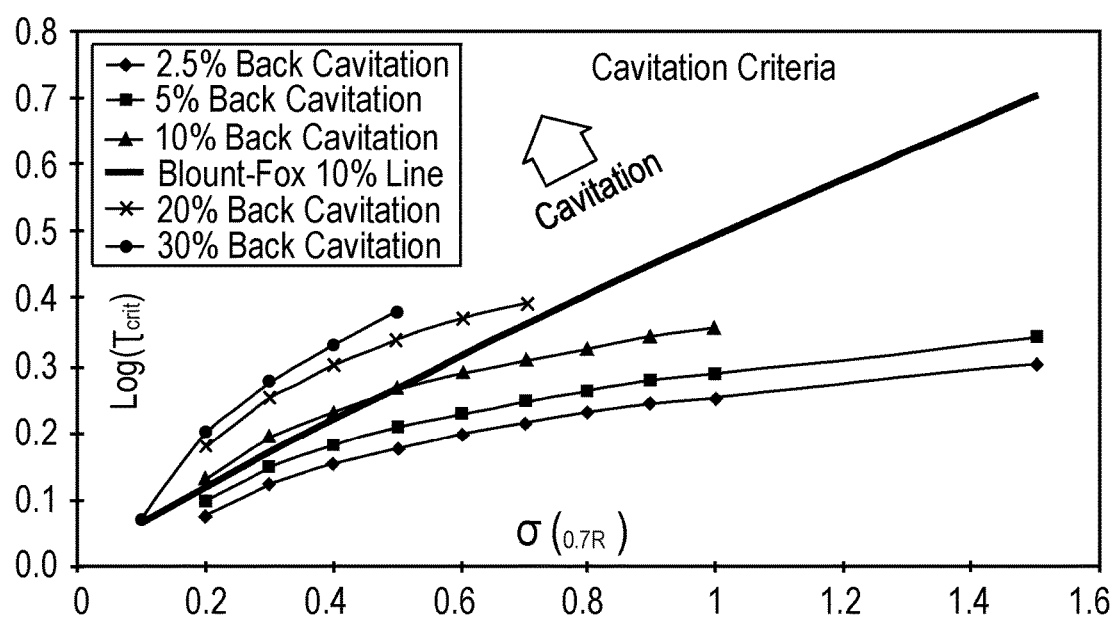
FIG. 6A is a graphical representation of cavitation criteria as a function of device parameters.
Figure 6B:
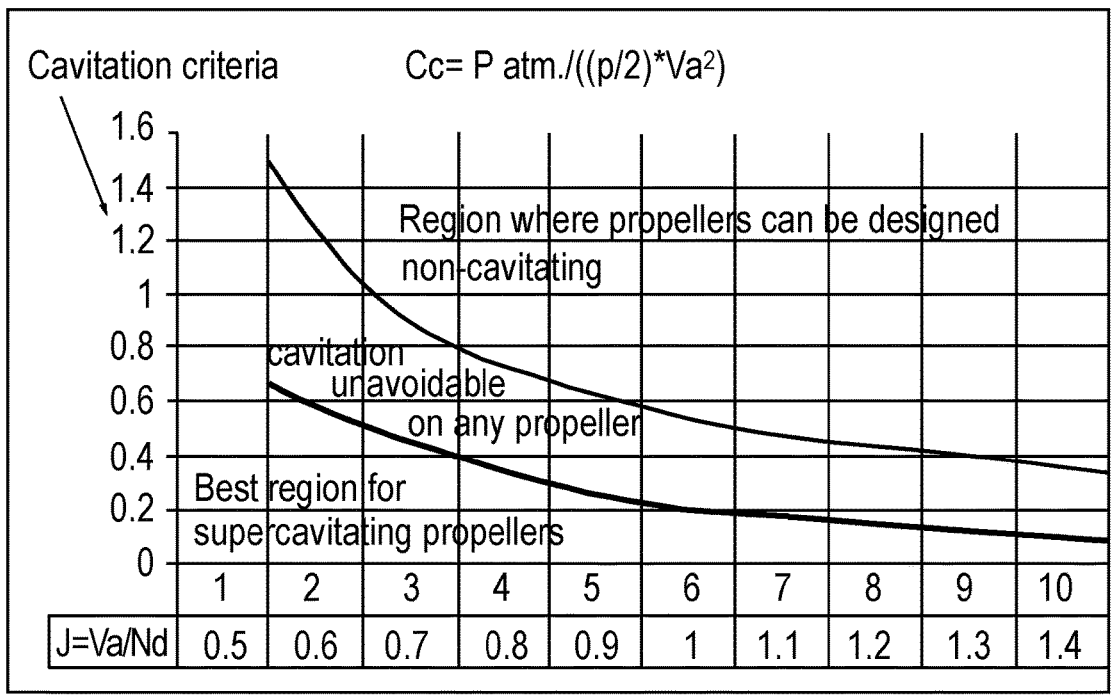
FIG. 6B is a graphical representation illustrating cavitation effects as a function of device parameters.

FIG. 6A and FIG. 6B are graphs which plot cavitation characteristics against rotary elements parameters. In preferred embodiments of the invention may utilise a propeller which comprises low Expanded Area Ratio (EAR) and/or Developed Area Ratio (DAR), which may be for example a DAR of less than around 40% in the case of a two bladed propeller, and less than around 55% for a three bladed propeller.

Figure 7:
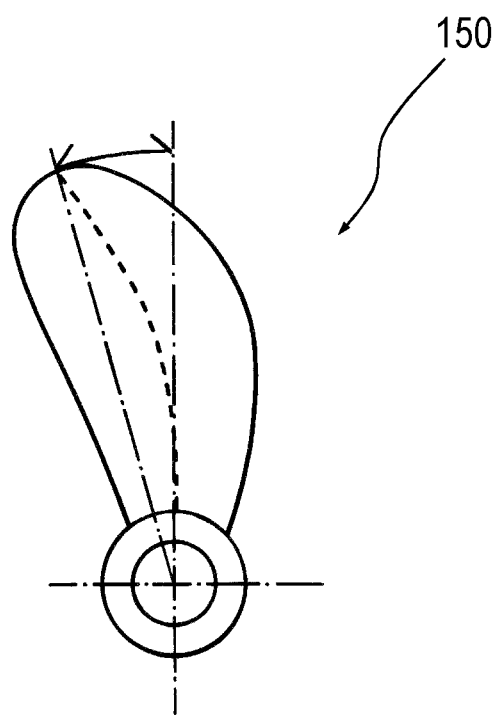
FIG. 7 is a schematic view of a single propeller blade which may be used in an embodiment of the invention.
Figure 8:
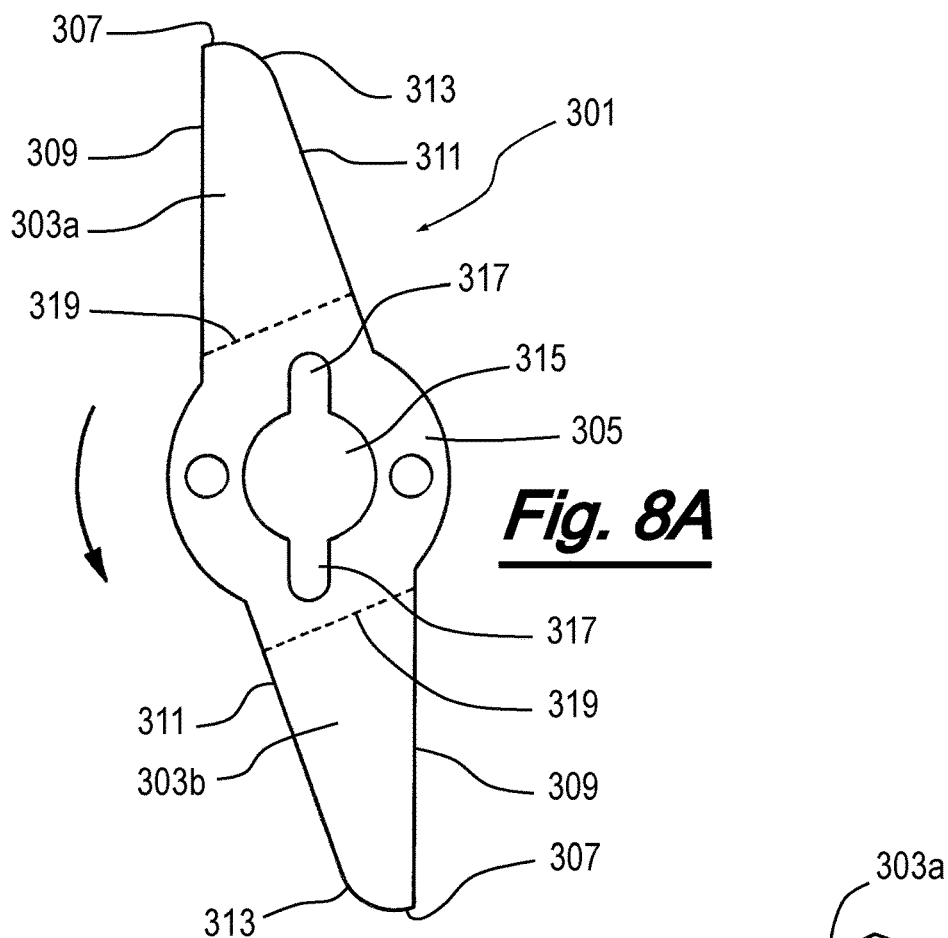
FIGS. 8A and 8B are respectively plan and isometric views of a blade form according to a preferred embodiment of the invention.
FIG. 8C is an isometric view of a finally formed and fully shaped blade form according to the embodiment of FIGS. 8A and 8B.

FIG. 7 is an example of a single propeller blade 150, which when used in a two-blade propeller would have a low DAR of around 30%. Preferred embodiments of the invention may utilise multiple propeller blades of similar form in its rotary elements in order to induce cavitation.

A preferred embodiment of the rotary assembly of the invention will now be described with reference to FIGS. 8 to 11. This embodiment has similarities with the rotary assemblies 100 and 120, and will be understood from FIGS. 3, 4 and 5 and their accompanying description. This embodiment is particularly suitable for use in the water treatment apparatus 20 of FIG. 2 (instead of the rotary assembly 100), and provide benefits including high intensity cavitation in close proximity of a radiation emitting surface of the UV source.

FIGS. 8A to 8C are different views of a blade element 301, which is designed to be mounted on an extended drive shaft and driven from an end of the drive shaft in a manner analogous to the assembly 100 of FIG. 3. FIGS. 8A and 8B are respectively plan and isometric views of the blade element 301, prior to shaping of the blade element 301 into its final form as shown in FIG. 8C.

The blade element 301 of this embodiment is formed from a stainless steel plate which is approximately 2 mm thick. The blade element 301 is initially formed into the planar form shown in FIGS. 8A and 8B by a suitable cutting method (for example, water cutting).

The blade element 301 comprises a pair of blades 303a, 303b extending from a central mounting portion 305. The central mounting portion 305 comprises a central aperture 315 for accommodating a drive shaft, recesses 317 for rotationally locking the blade element with respect to the drive shaft, and apertures for securing the blade element in the assembly. The pair of blades 303a, 303b taper towards respective tips 307, and are substantially diametrically opposed the central mounting portion. The blade element 301, which in this case is configured to rotate in an anti-clockwise direction, defines a leading edge 309 of each blade and trailing edge of each blade 311. The respective leading edges and trailing edges are parallel to one another, although proximal to the tips 307, the trailing edges are curved to provide an extended blade surface 313, such that the blades are not symmetrical about a line which bisects the tips.

The final shape of the blade element is then formed by bending or folding the blade element 301 with respect to the central portion, to form inclined blades 304a, 304b. The extent to which the blades are inclined determine the distance between the tips of the blades. The inclined blades 304a, 304b can be folded to any suitable angle, but the inventors have determined that a useful angle is between 50 and 60 degrees upwards from the plane of the central portion. In this embodiment, the line 319 along which the blades are folded is inclined and not perpendicular to the leading edge of the blade. In this case the angle is approximately 70 degrees. The blade element 2013 is completed by forming a sharpened bevelled edge 321 on the leading edges 309 of the inclined blades 304a, 304b.

Figure 9:
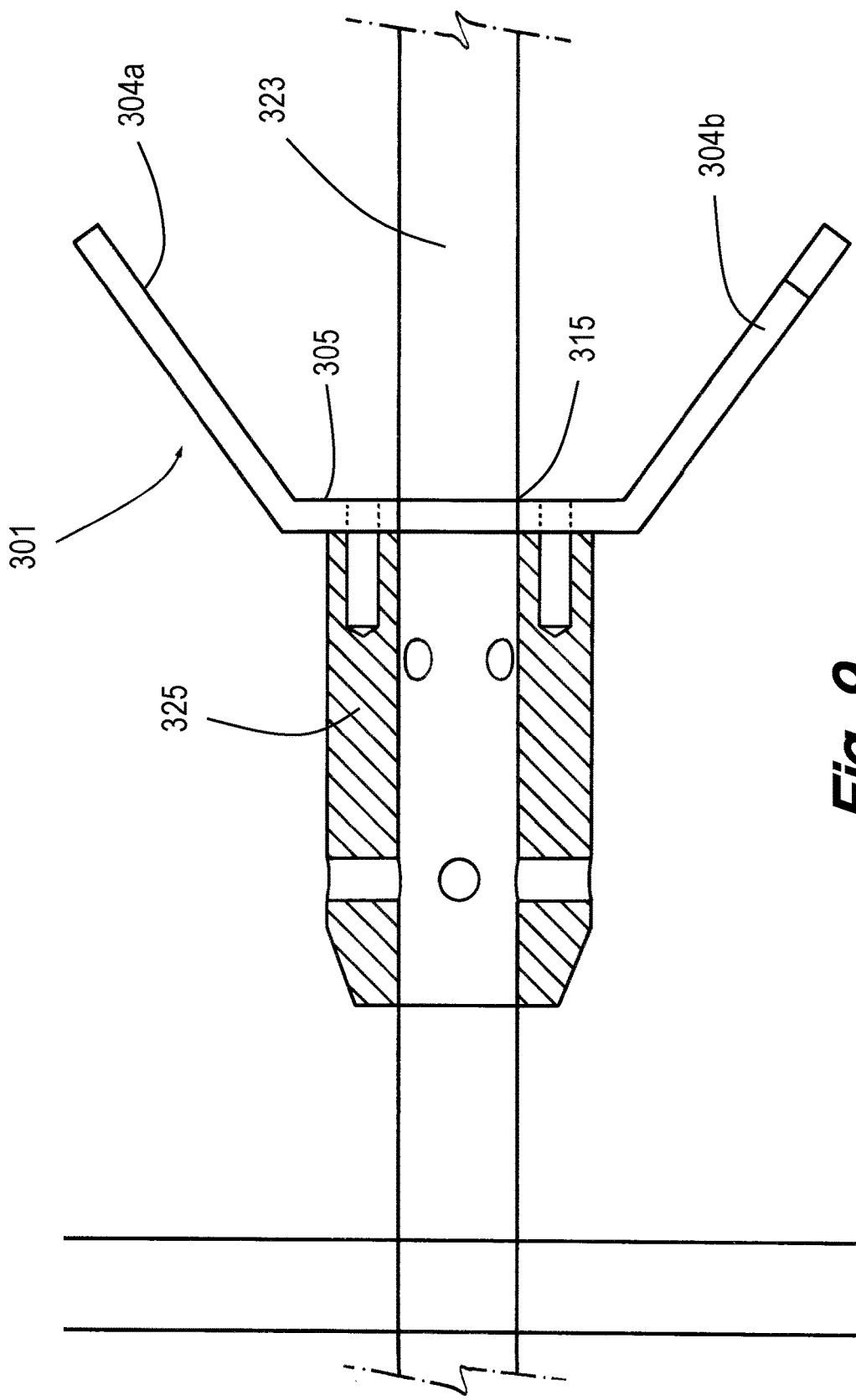
FIG. 9 is a schematic view of a rotary assembly formed from the blade of FIG. 8C, according to an embodiment of the invention.

FIG. 9 shows schematically the blade element 301 mounted to a drive shaft 323. The drive shaft 323 is received in the central aperture 315 of the central mounting portion 305 of the blade element, and is secured axially to the drive shaft by a mounting sleeve 325. The mounting sleeve comprises a substantially cylindrical body with a central throughbore to accommodate the drive shaft. Circumferentially spaced radial holes allow the sleeve to be secured to the drive shaft by means of screws (not shown). In addition, axial holes formed in the end surface of the cylindrical body enable the central mounting portion 305 to be secured to the sleeve by means of screws (not shown).

FIG. 9 shows just one blade element 301 assembled on a drive shaft 323, but in practice multiple blade elements are assembled on the drive shaft at axially separated locations, in the same manner as in the assembly 100 of FIG. 3.

The inventors have determined that it is advantageous in some liquid treatment applications to provide high intensity cavitation at axially separated locations along a liquid treatment flow path. The described configuration enables cavitation to be induced at different axial regions of the flow path along the surface of a UV radiation source, even in the relatively confined flow spaces which are advantageous for effective UV exposure.

The configuration enables rotary devices to be placed in close proximity to the radiation emitting surface in order to maximise the coincidence of the cavitation and UV radiation exposure. In some embodiments, the extremities of the rotary devices may be in the range of 5 mm to 10 mm, and in some cases less than 5 mm (for example 3 mm to 4 mm).

With appropriate selection of a drive motor and gearbox, high rotational speeds can be imparted to the rotary elements. In preferred embodiments, the blade elements are rotated at a speed in excess of 5,000 rpm. The preferred operating range of the blades may be in the region of 8,000 to 9,000 rpm, and in some cases, may be in the excess of 10,000 rpm.

High intensity cavitation induced by the described apparatus can be used to create cloud cavitation at multiple axial locations in an elongated flow stream, displaced along a radiation emitting surface such as a UV bulb.

Operational parameters such as those described above make it desirable that the drive shaft and rotary assemblies are well supported in the apparatus along their length.

FIGS. 10 and 11 show an example structure which may be used in order to support the drive shaft. FIG. 10 is a plan view of a shaft support element in the form of a support plate 340. The support plate 340 is of substantially circular form, and is designed to be mounted in the flow conduit 25 of the apparatus 20. The plate 340 is formed from stainless steel, and is cut to define an outer support ring 341 and an inner support ring 343. Spanning the plate between the inner support ring and the outer support ring are support sections 345. A central aperture 347 is defined by the inner support ring 343 receives the UV source, and four apertures 349 in the support sections are arranged to receive the drive shaft, so that the drive shaft is provided with support in a direction perpendicular to the axis of the shaft. Bearings (not shown) are provided in the apertures 349.

In this case, four support sections are provided in the support plate, one for each of the four drive shafts of four respective rotary assemblies. Disposed between each of the support sections are flow apertures 351, through which the liquid to be treated flows in the conduit 25.

FIG. 11 shows how the support plates of FIG. 10 may be configured in a support structure for multiple rotary assemblies. The support structure is in the form of a support cage 360, and comprises a series of axially spaced plates 340 connected by spacing combs 361 arranged circumferentially around the support plates. The resulting support is received in the conduit 25, and provides structural support for the drive shafts and blade elements in the conduit.

FIGS. 2 to 11 describe application of the principles of the invention to a flow conduit in a UV treatment apparatus. There will now be described, with reference to FIGS. 12 to 17, application of the principles of the invention to a pump used in a water treatment flow system.

Figure 12:
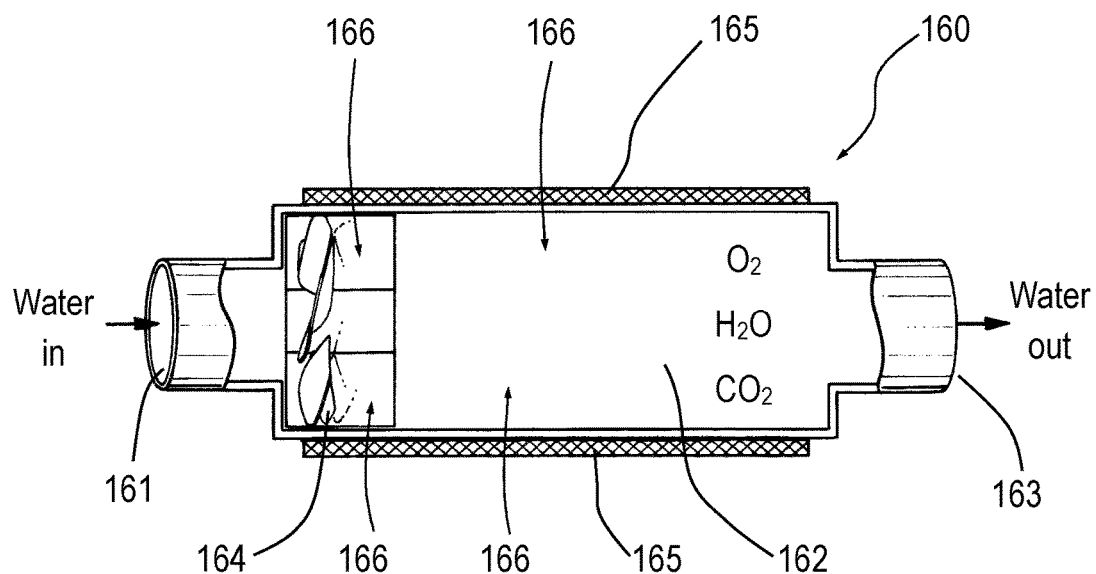
FIG. 12 is a schematic representation of a pump that may be used in the flow system of FIG. 1 in an embodiment of the invention.

FIG. 12 is a schematic representation of a pump, generally shown at 160, that may be used in the flow system 10 of FIG. 1 (for example, at any of the depicted pump locations 40, 41 or 42). The pump 160 is a rotary impeller pump, and comprises a pump cavity 162 disposed between an inlet 161 and an outlet 163. The pump cavity 162 contains an internal impeller 164, which is driven to rotate to impart thrust on fluid in the pump cavity to cause fluid to flow through the flow system.

The pump cavity comprises one or more windows, schematically depicted at 165, which enable transmission of UV radiation to the interior of the pump cavity, as depicted by the arrows 166. The windows 165 are in this embodiment formed from a synthetic fused silica (SFS) glass which is highly transmissive of UV radiation, including UV radiation in the UV-B and UV-C bands. The impeller 164 is formed from a metal (for example stainless steel) coated with titanium dioxide to provide photocatalytic benefits to the advanced oxidation process reaction.

In preferred embodiments of the invention, the impeller 164 of the pump 160 is driven in a cavitation mode such that, in addition to the thrust imparted on the fluid, cavitation is induced and enhances the advanced oxidation process reaction. Cavitation may be achieved by design of the impeller, the torque and/or RPM regime in which it is driven, or a combination of the two factors.

However, the invention is not limited to an apparatus configuration or mode of use in which the pump is driven in cavitating mode, and there are more general advantages to the association of UV exposure with a pumping apparatus in an advanced oxidation process reaction. For example, the pump 160 is a convenient location for additional exposure of the fluid to ultraviolet radiation. The UV radiation is input into the system in a location at which the treatment fluid is being mixed and sheared by the action of the impeller. Furthermore, the UV source may be driven from a common power source that also drives the pump motor. In addition, the pump provides a convenient location for the injection of gases, or the injection of chemical additives such as peroxides which may further enhance the advanced oxidation process reaction.

Figure 13:
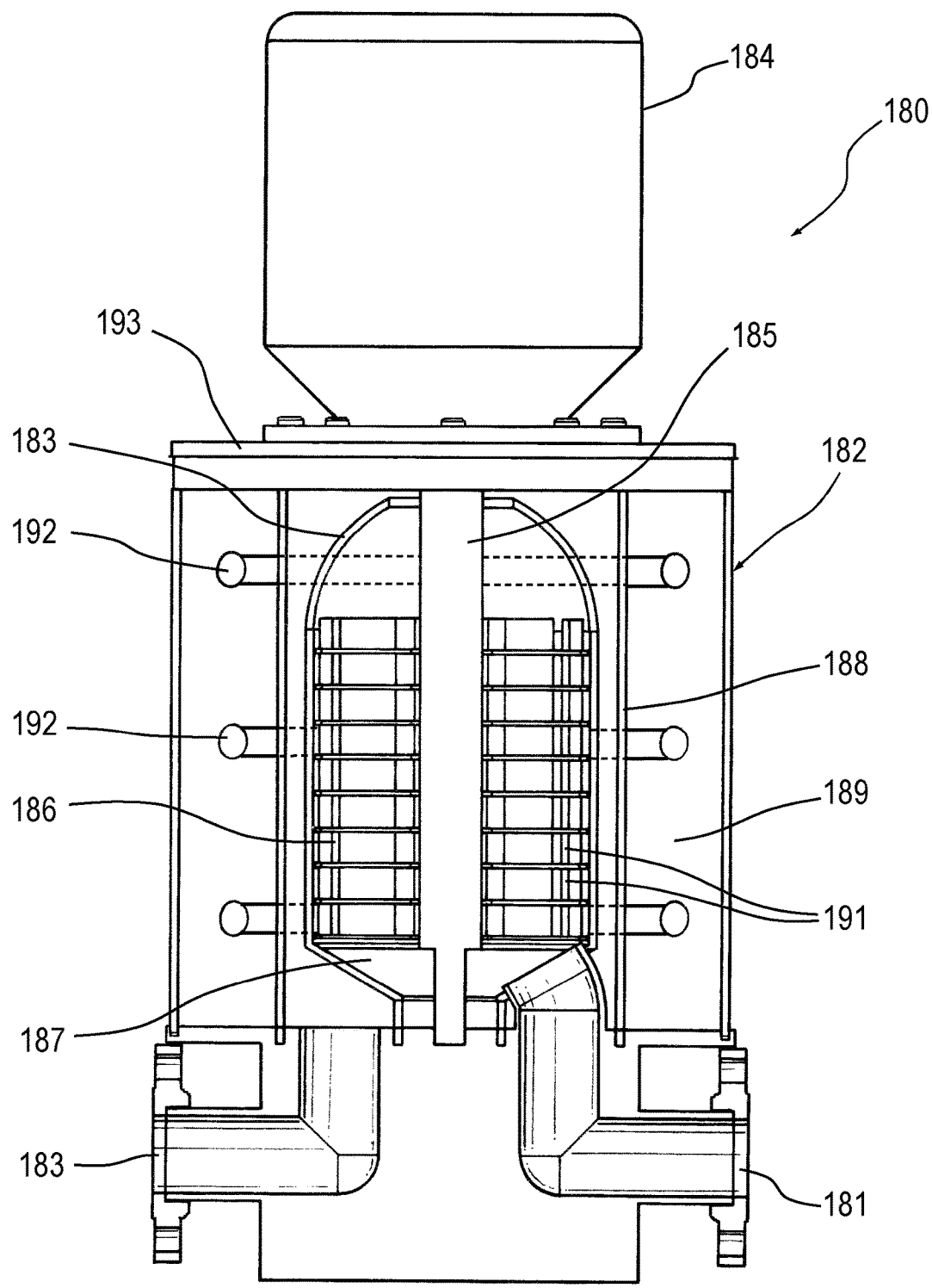
FIG. 13 is a schematic representation of a vertical centrifugal pump according to an embodiment of the invention.

FIG. 13 illustrates a further alternative embodiment of the invention, in which the inventive principles are applied to a vertical centrifugal pump. The pump, generally depicted at 180, comprises a pump housing 182, a pump inlet 181 and a pump outlet 183. The housing 182 is substantially cylindrical, arranged around a longitudinal axis. A motor assembly is disposed above the pump housing and is connected to a drive shaft 185 of an impeller assembly 186. The motor assembly 184 is a variable speed motor, capable of operating across a wide range of torque and rpm, depending on pump requirements.

Pump cavity 187 is substantially cylindrical and has a smaller inner diameter than the housing 182. The internal dimensions of the pump cavity are determined by a cylindrical sheath 188, which separates the interior of the cavity 187 from the housing 182. The sheath is formed from a material which is transmissive to UV radiation, and in this embodiment is a synthetic fused silica (SFS) glass. The impeller assembly is disposed within an internal structure 183 which is also formed from a UV transmissive material.

The motor assembly is mounted to an upper flange plate 193 of the pump. Removal of the motor assembly provides access to the pump cavity, through which the impeller assembly may be removed for servicing and/or replacement.

A UV radiation source is provided in the annular space 189 defined between the pump cavity and the pump housing. In the pump 180, the UV source comprises three UV lamps 192 axially separated along the pump housing. Each UV lamp 192 is toroidal in shape, and substantially surrounds the entirety of the pump cavity 187 at its axial location.

The impeller assembly 186 comprises a plurality of impeller elements 191, axially distributed along the assembly in a stack. In this embodiment, the impellers are of a semi-open design, as is known in the field of centrifugal pump design. The assembly 186 is driven to rotate by the motor assembly, and the centrifugal motion of the fluid generates a pressure differential across the inlet and outlet in a conventional manner. The impeller assembly is coated with titanium dioxide so that it provides a photocatalytic enhancement to the advanced oxidation process reaction in use.

The pump 180 may be driven in a non-cavitating mode, in which cavitation is not induced within the pump cavity and the pump provides an impulsive force on the liquid to cause it to flow through the flow system. However, the impeller is also designed to be operated in a cavitation mode, with one or more of the impeller elements designed to induce cavitation in addition to the generation of a pressure differential across the pump.

Figure 14:
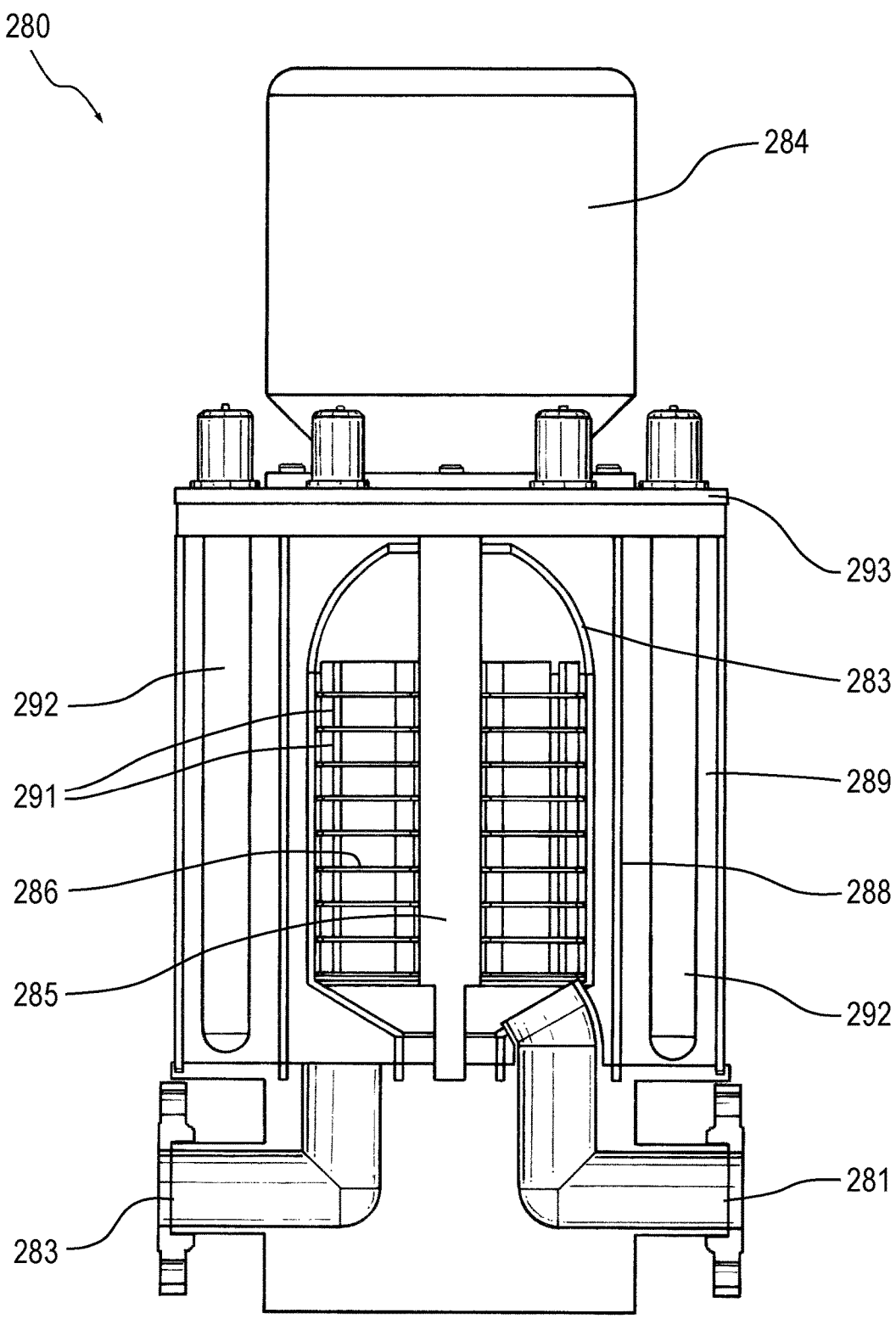
FIG. 14 is a schematic representation of a vertical centrifugal pump according to an alternative embodiment of the invention.

Referring now to FIG. 14, there is shown a pump according to an alternative embodiment of the invention. The pump, generally shown at 280, is similar to the pump 180 and its features and operation will be understood from FIG. 13 and the accompanying description. The pump 200 is a vertical centrifugal pump, and like components of the pump 280 are given like reference numerals, incremented by 100.

The pump 280 differs from the pump 180 in that vertically-oriented UV lamps 292 are used instead of the toroidal UV lamps of the pump 180. The lamps 292 are located in the annular space 289 between the sheath 288 and the pump housing 282. In this embodiment, six UV lamps 292 are spaced circumferentially around the annular space. Each UV lamp 292 is oriented parallel to the longitudinal axis and is mounted in an upper flange plate 293, such that the UV lamp can be readily removed and replaced if required.

Figure 15A:
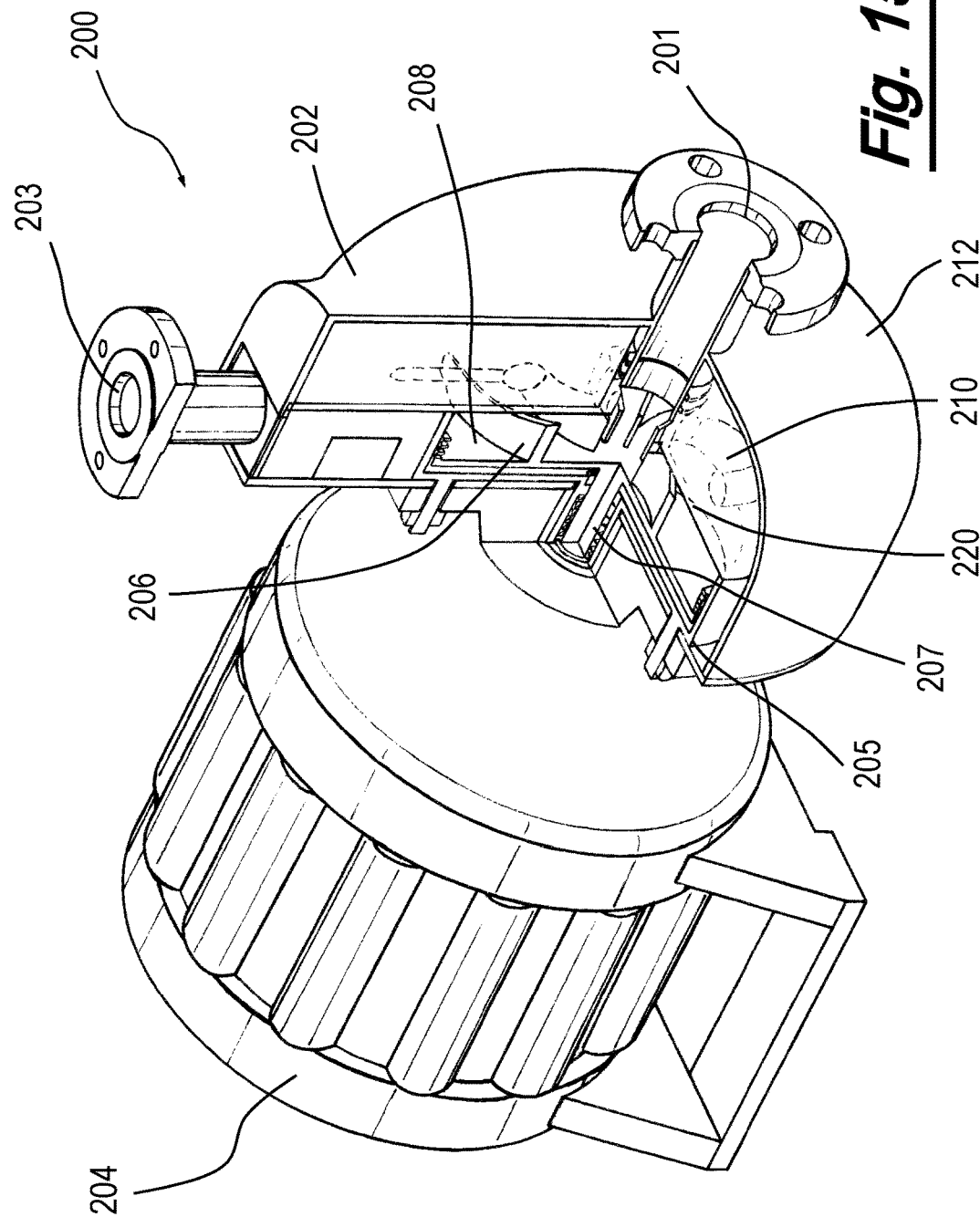
FIG. 15A and FIG. 15B are respectively an isometric, partial cut-away view and a reverse isometric view of a pump according to an alternative embodiment of the invention.
Figure 15B:
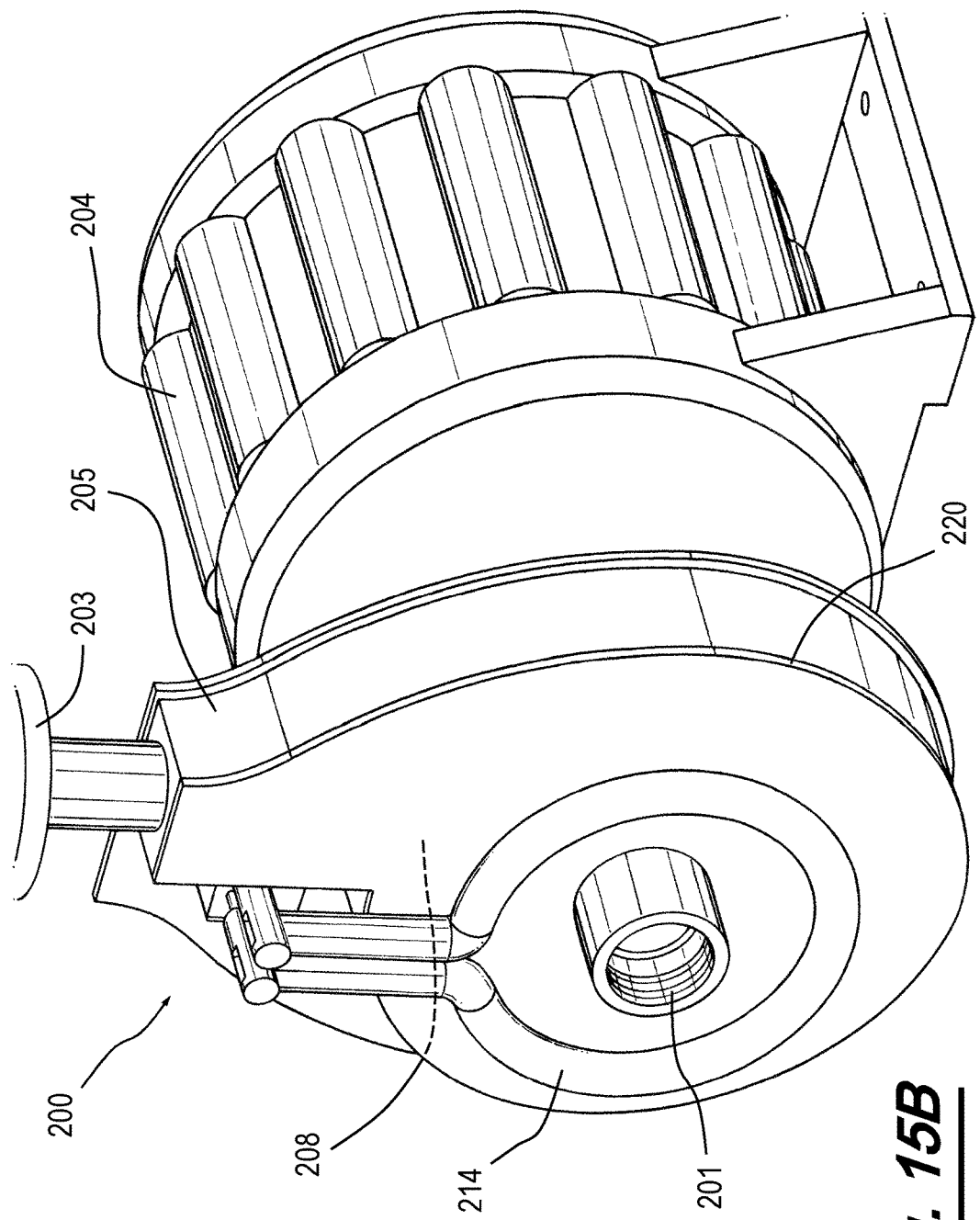

Referring now to FIGS. 15A and 15B, there is shown a pump according to a further alternative embodiment of the invention. FIG. 15A is an isometric, partial cutaway view of the pump, generally depicted at 200. FIG. 15B is a reverse isometric view, with a casing element of the pump removed to show some internal components.

The pump 200 is a horizontal axis centrifugal pump, and comprises a pump unit 202 and a motor assembly 204. The pump unit 202 comprises an inlet 201 and an outlet 203.

Within the pump unit 202, a pump housing 205 defines a pump cavity 208, in which is rotatably mounted an impeller element 206. The impeller element 206 is of a semi open type, as is known in the art of centrifugal pumps. The impeller element is mounted to a drive shaft 207 which extends into the pump unit from the motor assembly 204. Axially spaced from the pump cavity 208 in a direction away from the motor assembly 204, there is provided a volume 210 defined by an outer casing 212 (in FIG. 15A, the outer casing is partially cut away, and in FIG. 15B, the outer casing is removed entirely). Volume 210 accommodates a UV radiation source, in the form of a toroidal UV lamp 214. The UV lamp is electrically and mechanically connected to the pump unit at an upper portion of the pump unit, and follows a circular path extending around the axis of the impeller and the inlet 201. A wall 220 separates the pump cavity from the volume. The wall is formed from a UV transmissive material, which in this case is a synthetic fused silica (SFS) glass. In use, fluid pumped through the centrifugal pump is exposed to UV radiation through the wall 220.

The pump described with reference to FIGS. 12 to 15A and 15B may be operated in a cavitating mode in order to induce cavitation in the pump cavity and improve the efficiency and effectiveness of the advanced oxidation process reaction. This is in contrast to the conventional operation of rotary pumps, in which it is generally undesirable to induce cavitation due to its detrimental effects on exposed materials and increased wear on moving components. Pumps of this aspect of the invention differ from the prior art in that cavitation is tolerated (and preferably optimised, by virtue of the design of the rotary device and/or the drive regime used) due to the benefits to the liquid treatment application. In other words, a degree of degradation and/or deterioration of flow surfaces and/or moving components may be acceptable in embodiments of the invention.

Preferably, the pumps are readily serviceable, so that any degrading or deteriorating materials or components can be removed and repaired or replaced as is necessary. In the embodiment shown in FIGS. 13 and 14, this is facilitated by removal of the impeller assembly through the upper flange 193, 293.

Figure 16:
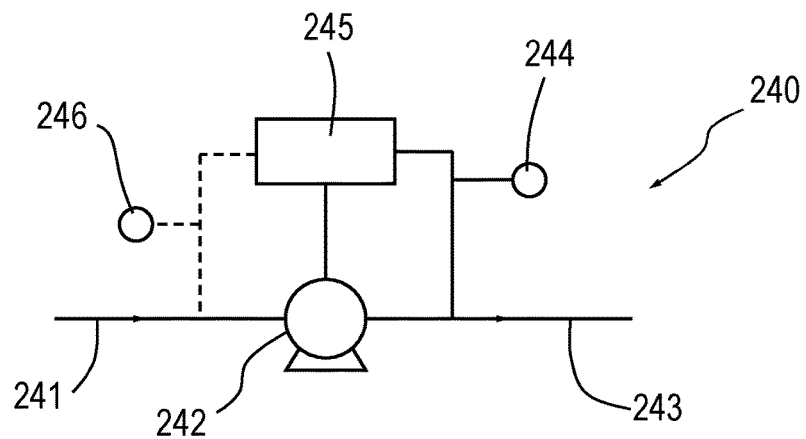
FIG. 16 is a schematic view of a control system through a pump that may be used in accordance with preferred embodiments of the invention.

Tolerating and/or optimising cavitation of the pumps may mean that it is desirable to monitor pump performance. FIG. 16 shows schematically a control system for a pump that may be used in accordance with preferred embodiments of the invention. The system, generally shown at 240, shows a pump 242 connected between a flow inlet 241 and a flow outlet 243. The pressure sensor 244 is provided on an outlet side of the pump, and is in communication with a pump control module 245. Optionally, a second pressure sensor 246 is provided on the inlet side of the pump. The control module 245 provides a control signal for a variable speed motor (not shown) incorporated in the pump.

Monitoring the pressure on the output side of the pump is a convenient means for measuring pump performance. A change in pressure (for example, a reduction in output pressure), may be indicative of a deterioration or degradation of pump components due to cavitation having caused wear or pitting on a rotary device within the pump. By detecting changes in pressure, the control module can automatically (or by user control) adjust parameters of the drive motor, for example, revolutions per minute and/or torque in order to modify the operation of the pump. This adjustment may of course be selected to maintain a desired output pressure. However, significantly, the adjustment enables maintains operation of the pump in a cavitation mode. By monitoring output pressure, the pump can be driven to continue to induce cavitation, in spite of degradation and/or wear to pump components.

One or more of the pumps of FIGS. 12 to 15 may include sacrificial components which are designed to wear, degrade or otherwise deteriorate in use. In particular, the rotary device, or a component thereof, may be designed to wear, degrade or otherwise deteriorate as a consequence of cavitation induced by the rotary device. In some embodiments, the feedback loop described with reference to FIG. 16 may be used to monitor cavitation by monitoring a degradation in pump performance over time due to deterioration of a sacrificial propeller or impeller.

Preferred implementations of the rotary assemblies used in pumping applications of the present invention incorporate non-oil or non-grease lubricated bearings, such as the water lubricated non-metallic bearings manufactured by Thordon Bearings, Inc.

It will be appreciated that the rotary elements of aspects invention may be applied to a wide range of fluid vessels and fluid conduits in water treatment systems, including in separation vessels configured for the separation of liquids, gases and solids from a treatment liquid by hydrocyclonic processes.

It will be appreciated that, in common with the other embodiments of the invention, other photocatalytic compounds may be used to coat the various rotary devices and/or associated components. Photocatalytic compounds which may be used within the scope of the invention include but are not limited to photocatalytic metal oxides, including for example aluminium oxide. In a further alternative embodiment, the rotary devices or components thereof are partially or fully constructed from a photocatalytic material (rather than being formed from a non-catalytic material which is subsequently coated). The material may, for example, be a composite of a polymeric material and a photocatalytic metal oxide.

In variations to the described embodiments, the flow systems may be provided with supplementary static mixer elements which serve to further promote shearing, mixing and dissolution of injected gas, and which may induce hydrodynamic cavitation in the flowing fluid.

The described apparatus and methods of use improves the efficiency, effectiveness, or capacity of an advanced oxidation process reaction by providing improved gas injection configurations and/or control and improving the effectiveness of UV radiation at one or more treatment locations.

Variations to the above-described embodiments are envisaged within the scope of the invention. In particular, one or more of the wet flow surfaces of the apparatus may be provided with a surface treatment which reduces the tendency of the apparatus to become dirty. Example surface treatments include treating the wet flow surfaces with a water repellent or hydrophobic material. Another example is to treat the wet flow surfaces in order to modify the surface energy, for example by performing a corona discharge treatment method, or other electrical treatment to the surfaces.

The foregoing embodiments are primarily described with reference to advanced oxidation processes which utilise injection of ozone gas in conjunction with exposure of the liquid to be treated to UV radiation. It will be appreciated that the methods described above are compatible with photocatalytic advanced oxidation processes. Alternative embodiments of the invention may therefore apply photocatalytic materials to enhance the reaction processes. In one example, photocatalytic compounds such as powdered titanium dioxide or liquid hydrogen peroxide are added to the liquid to be treated such that they are present in the flow unit as it is exposed to UV radiation. Known mechanisms can be used to recover photocatalytic particles or compounds present in the flow liquid.

In other variations, photocatalytic materials may be used to coat and/or construct components of the apparatus which are within the liquid treatment flow path. For example, barrels and/or redirection volumes may be coated with photocatalytic materials such as titanium dioxide or aluminium oxide.

In further alternatives, one or more sacrificial anodes, which may be passive or active, may be provided within the wet flow conduits of the apparatus. For example, passive or active anodes of aluminium oxide or titanium oxide may preferentially oxidise, reducing build up of corrosion or other scales on wet flow components.

More alternative embodiments of the invention, aluminium components may be used. These may preferentially oxidise to form aluminium oxide which has a photocatalytic benefit to the reaction system.

Various (non-illustrated) embodiments of the invention may be provided with ultrasonic transducers, coupled to one or more of the components which are exposed to the flow of liquid. Application of current to the transducers causes ultrasonic acoustic vibration modes with the apparatus, which may assist in a reduction of scale or the build up of materials on the wet flow components, and may also assist with the movement of undissolved gas through the system. The placement and operation of ultrasonic transducers may also reduce friction between moving components (such as the wipers and the thimbles of particular embodiments of the invention). In particular, ultrasonic transducers may be coupled to plastic, synthetic silica, or metal components of the treatment apparatus.

The invention extends to combinations of features other than those expressly described herein and those defined in the appended claims.

What is claimed is:

1. An apparatus for use in a liquid treatment process, the apparatus comprising:
    an inlet configured to be connected to a source of liquid to be treated;
    an outlet for discharging liquid from the apparatus;
    at least one liquid treatment vessel or conduit disposed between the inlet and the outlet, and arranged to expose liquid in the vessel to ultraviolet radiation in an advanced oxidation process reaction;
    a source of ultraviolet radiation extending along the liquid treatment vessel or conduit, such that an annular flow volume is defined in the vessel or conduit around the source of ultraviolet radiation;
    a plurality of rotary devices disposed in the annular flow volume, wherein each of the rotary devices comprises one or more vanes or blades, and wherein the plurality of rotary devices is distributed circumferentially around the annular flow volume;
    and comprising a plurality of drive mechanisms, each drive mechanism arranged to drive rotation of a respective one of the plurality of rotary devices;
    wherein the apparatus is operable to drive the plurality of rotary devices to induce cavitation in a liquid present in the annular flow volume at the circumferentially distributed positions of the plurality of rotary devices in the annular flow volume.

2. The apparatus according to claim 1, wherein each rotary device of the plurality of rotary devices comprises a plurality of rotary elements axially separated in the vessel or conduit, each rotary element comprising one or more vanes or blades.

3. The apparatus according to claim 2, wherein the axially separated rotary elements of one rotary device of the plurality of rotary devices are driven by a common drive mechanism of the plurality of drive mechanisms.

4. The apparatus according to claim 1, wherein at least one of the plurality of rotary devices is configured to generate a thrust on a liquid in the liquid treatment vessel.

5. The apparatus according to claim 4, wherein at least one of the plurality of rotary devices is operable to generate a thrust on a liquid present in the liquid treatment vessel, to cause liquid to flow from the inlet to the outlet.

6. The apparatus according to claim 1, wherein at least one of the plurality of rotary devices comprises one or more sacrificial components which wears, degrades or otherwise deteriorates as a consequence of cavitation induced by at least one rotary device.

7. The apparatus according to claim 1, wherein one or more components of the apparatus comprises aluminium.

8. The apparatus according to claim 1, wherein one or more components of the apparatus is partially or fully coated with a photocatalytic material.

9. The apparatus according to claim 1, wherein one or more components of the apparatus is partially of fully constructed from a photocatalytic material.

10. The apparatus according to claim 8, wherein the photocatalytic material is a composite of a polymeric material and a photocatalytic metal oxide.

11. The apparatus according to claim 1, wherein in use, at least one of the plurality of rotary devices is arranged to be disposed a distance less than 10 mm from a radiation-emitting surface of the source of ultraviolet radiation.

12. The apparatus according to claim 11, wherein in use, at least one of the plurality of rotary devices is arranged to be disposed a distance less than 5 mm from a radiation-emitting surface of the source of ultraviolet radiation.

13. The apparatus according to claim 1, comprising a support structure for at least one of the plurality of rotary devices.

14. The apparatus according to claim 13, wherein the support structure comprises a plurality of axially separated support elements which support a drive shaft of the at least one rotary device.

15. The apparatus according to claim 14, wherein the axially separated support elements comprise support plates, each support plate being configured to support multiple rotary devices of the plurality of rotary devices in the liquid treatment vessel or conduit.

16. A method of treating a liquid in an advanced oxidation process reaction, the method comprising:
    directing liquid to be treated through an annular flow volume around a source of ultraviolet radiation in at least one liquid treatment vessel or conduit;

exposing liquid in the vessel or conduit to ultraviolet radiation;

driving a plurality of rotary devices disposed in the annular flow volume, wherein each of the rotary devices comprises one or more vanes or blades and wherein the plurality of rotary devices is distributed circumferentially around the annular flow volume, to induce cavitation in the liquid present in the annular flow volume at the circumferentially distributed positions of the plurality of rotary devices in the annular flow volume.

17. The method according to claim 16 comprising inducing cavitation in the liquid present in the annular flow volume at multiple locations axially separated along the source of ultraviolet radiation.

18. The apparatus according to claim 2, wherein the apparatus is operable to induce cavitation in the liquid present in the annular flow volume at multiple locations axially separated along the source of ultraviolet radiation.

19. The apparatus according to claim 1, wherein the plurality of rotary devices comprises blade elements, and a respective drive mechanism is operable to rotate the blade elements at a speed in excess of 5,000 rpm.

* * * * *